(12) United States Patent
Rodway

(10) Patent No.: US 8,912,679 B2
(45) Date of Patent: Dec. 16, 2014

(54) WIND TURBINE SYSTEM

(75) Inventor: Giles Henry Rodway, Calne (GB)

(73) Assignee: Spinetic Energy Limited, Chippenham (GB)

( * ) Notice: Subject to any disclaimer, the term of this patent is extended or adjusted under 35 U.S.C. 154(b) by 251 days.

(21) Appl. No.: 13/579,547

(22) PCT Filed: Mar. 3, 2011

(86) PCT No.: PCT/GB2011/000293
§ 371 (c)(1),
(2), (4) Date: Sep. 7, 2012

(87) PCT Pub. No.: WO2011/101650
PCT Pub. Date: Aug. 25, 2011

(65) Prior Publication Data
US 2012/0326447 A1    Dec. 27, 2012

(30) Foreign Application Priority Data

Feb. 17, 2010    (GB) .................................. 1002646.6

(51) Int. Cl.
*F03D 9/00* (2006.01)
*F03D 3/02* (2006.01)

(52) U.S. Cl.
CPC ............... *F03D 3/02* (2013.01); *F05B 2240/40* (2013.01); *Y02E 10/74* (2013.01)
USPC ........................................................ 290/55

(58) Field of Classification Search
USPC .................................... 290/44, 55
See application file for complete search history.

(56) References Cited

U.S. PATENT DOCUMENTS

| 1,876,595 | A | | 9/1932 | Beldimano | |
| 2,218,867 | A | | 10/1940 | Beldimano | |
| 4,165,468 | A | * | 8/1979 | Fry et al. | 290/55 |
| 4,220,870 | A | * | 9/1980 | Kelly | 290/44 |
| 4,265,086 | A | | 5/1981 | Bahrenburg | |
| 5,394,016 | A | * | 2/1995 | Hickey | 290/55 |
| 5,494,407 | A | | 2/1996 | Benesh | |
| 5,642,984 | A | | 7/1997 | Gorlov | |
| 6,749,399 | B2 | | 6/2004 | Heronemus | |

(Continued)

FOREIGN PATENT DOCUMENTS

| DE | 10160836 A1 | 6/2003 |
| DE | 10353118 A1 | 6/2005 |

(Continued)

OTHER PUBLICATIONS

ISA European Patent Office, International Search Report of PCT/GB2011/000293, Nov. 25, 2011, WIPO, 4 pages.

(Continued)

*Primary Examiner* — Tulsidas C Patel
*Assistant Examiner* — Viet Nguyen
(74) *Attorney, Agent, or Firm* — Alleman Hall McCoy Russell & Tuttle LLP

(57) ABSTRACT

A modular wind turbine system comprises modules with electrically conductive structural rails supporting wind turbines. The wind turbines drive generators electrically connected to the rails. Individual modules are electrically and mechanically linked to adjacent modules, simultaneously bracing the overall structure and providing a means of conveying the electricity, produced by the generators, to the location or locations required for consumption, storage or onward transmission of that electricity.

20 Claims, 14 Drawing Sheets

(56) References Cited

U.S. PATENT DOCUMENTS

| | | | |
|---|---|---|---|
| 7,777,363 B2 * | 8/2010 | Wang et al. | 290/55 |
| 8,541,897 B2 * | 9/2013 | Khoshnevis | 290/44 |
| 2009/0146435 A1 * | 6/2009 | Freda | 290/55 |

FOREIGN PATENT DOCUMENTS

| | | | |
|---|---|---|---|
| FR | 1325279 A | 4/1963 | |
| WO | 2005052362 A2 | 6/2005 | |
| WO | 2005111416 A1 | 11/2005 | |
| WO | 2009130691 A1 | 10/2009 | |
| WO | 2010045870 A1 | 4/2010 | |

OTHER PUBLICATIONS

Intellectual Property Office of the United Kingdom, Search Report of GB1002646.6, Jun. 24, 2010, United Kingdom, 2 pages.
Intellectual Property Office of the United Kingdom, Search Report of GB1002646.6, Nov. 15, 2010, United Kingdom, 1 page.

* cited by examiner

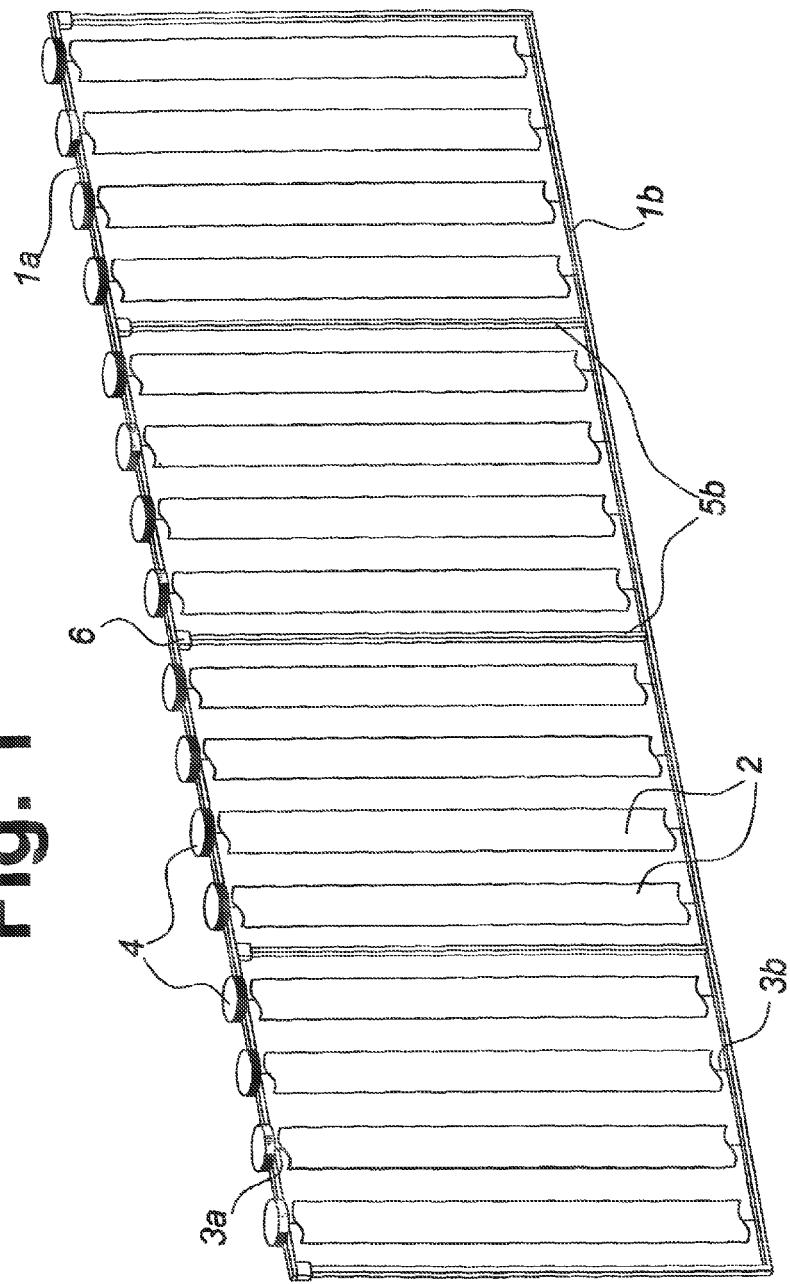

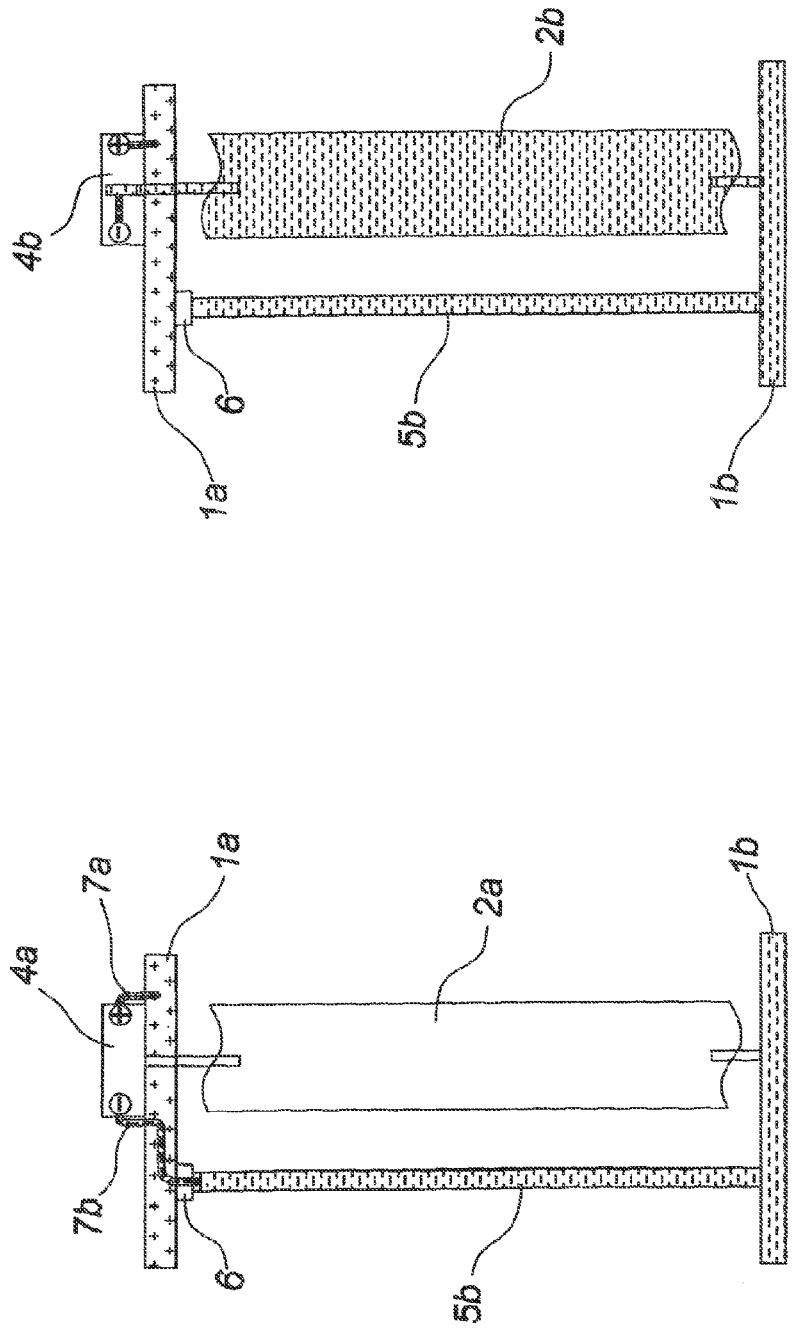

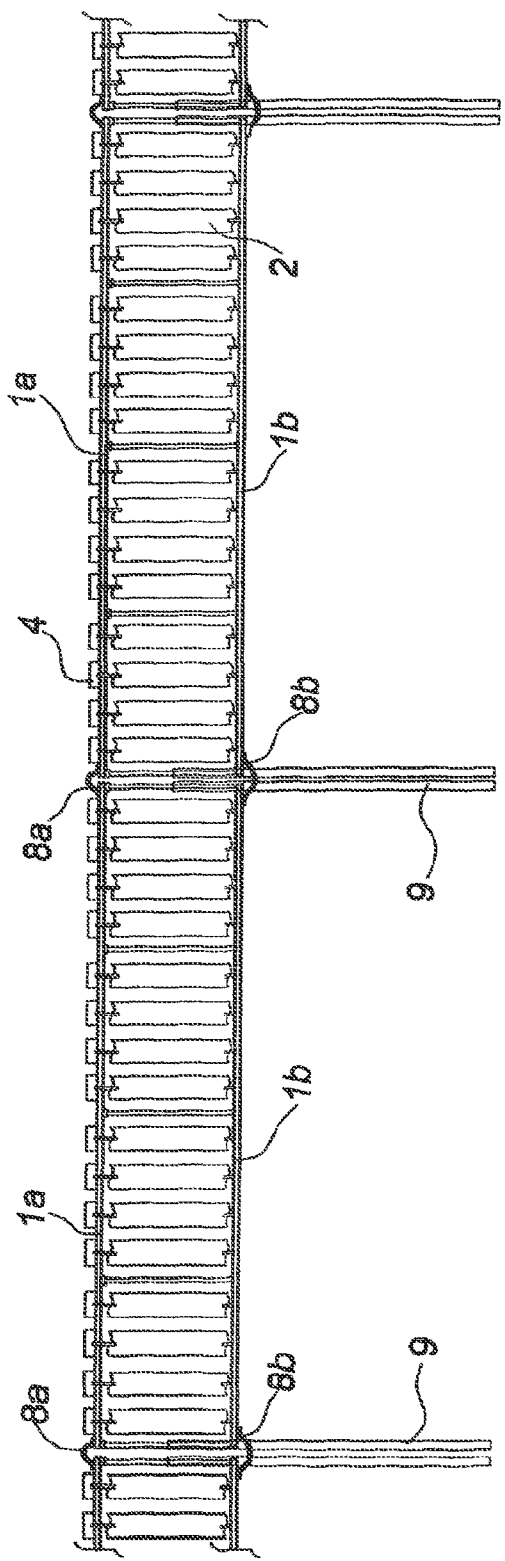

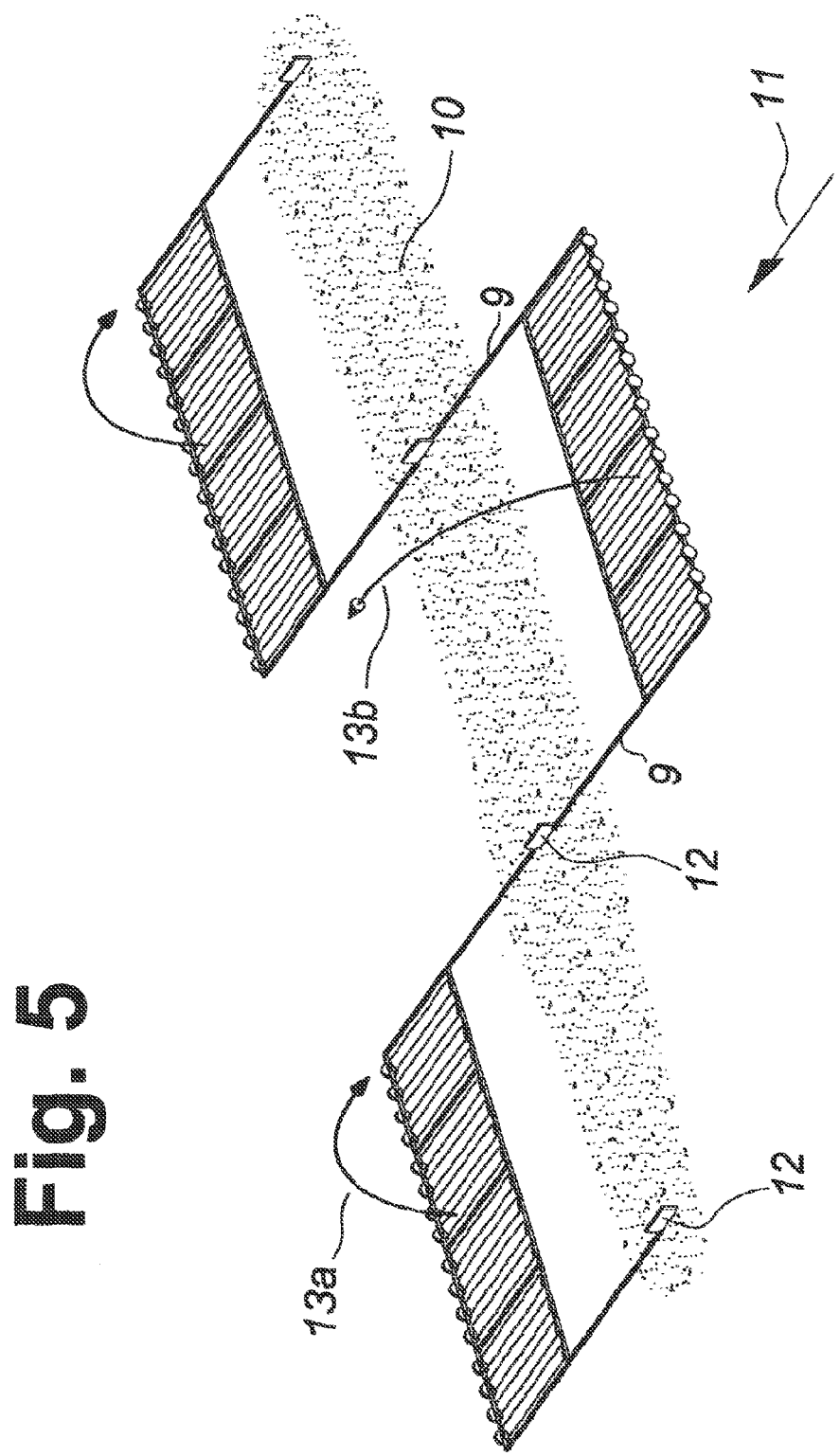

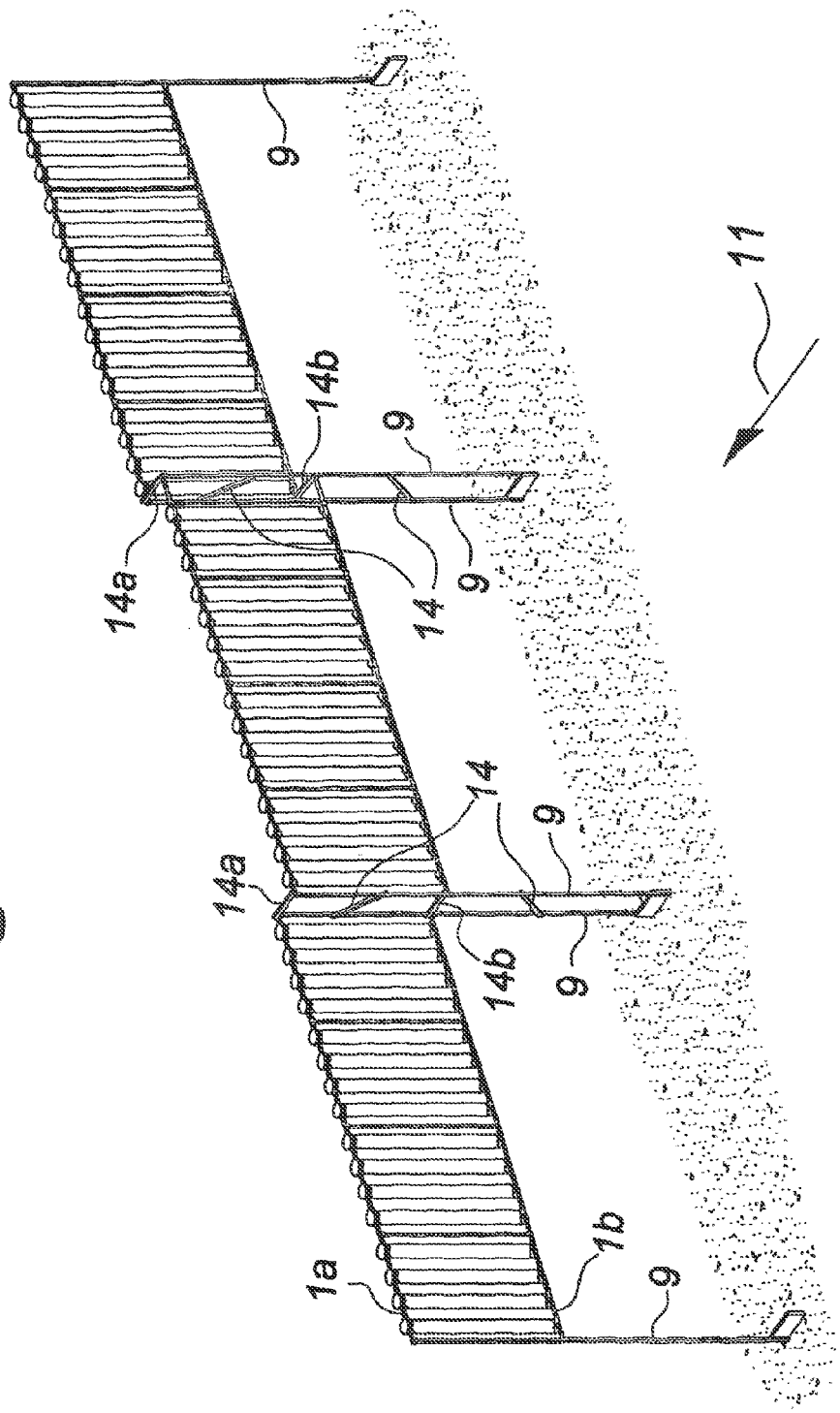

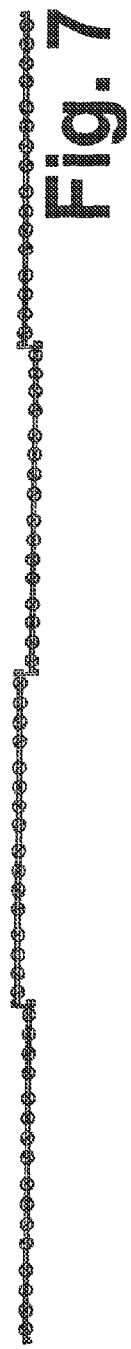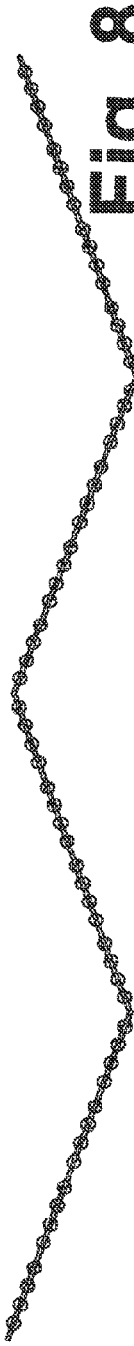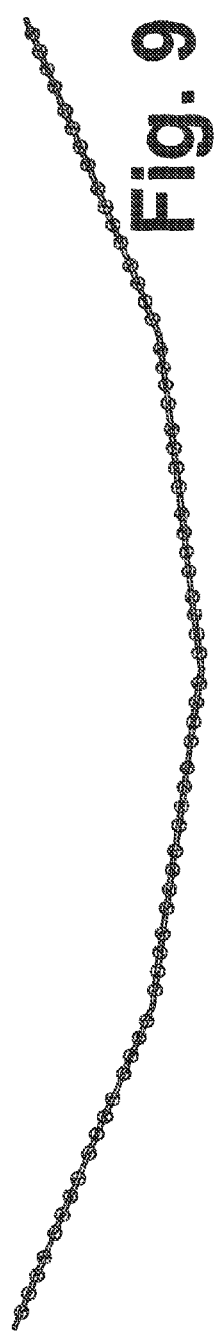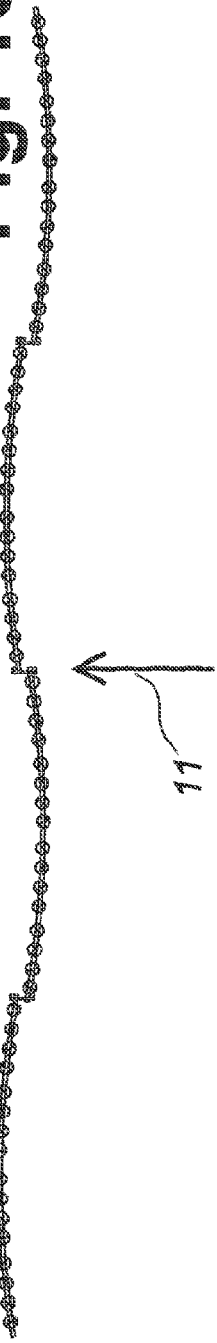

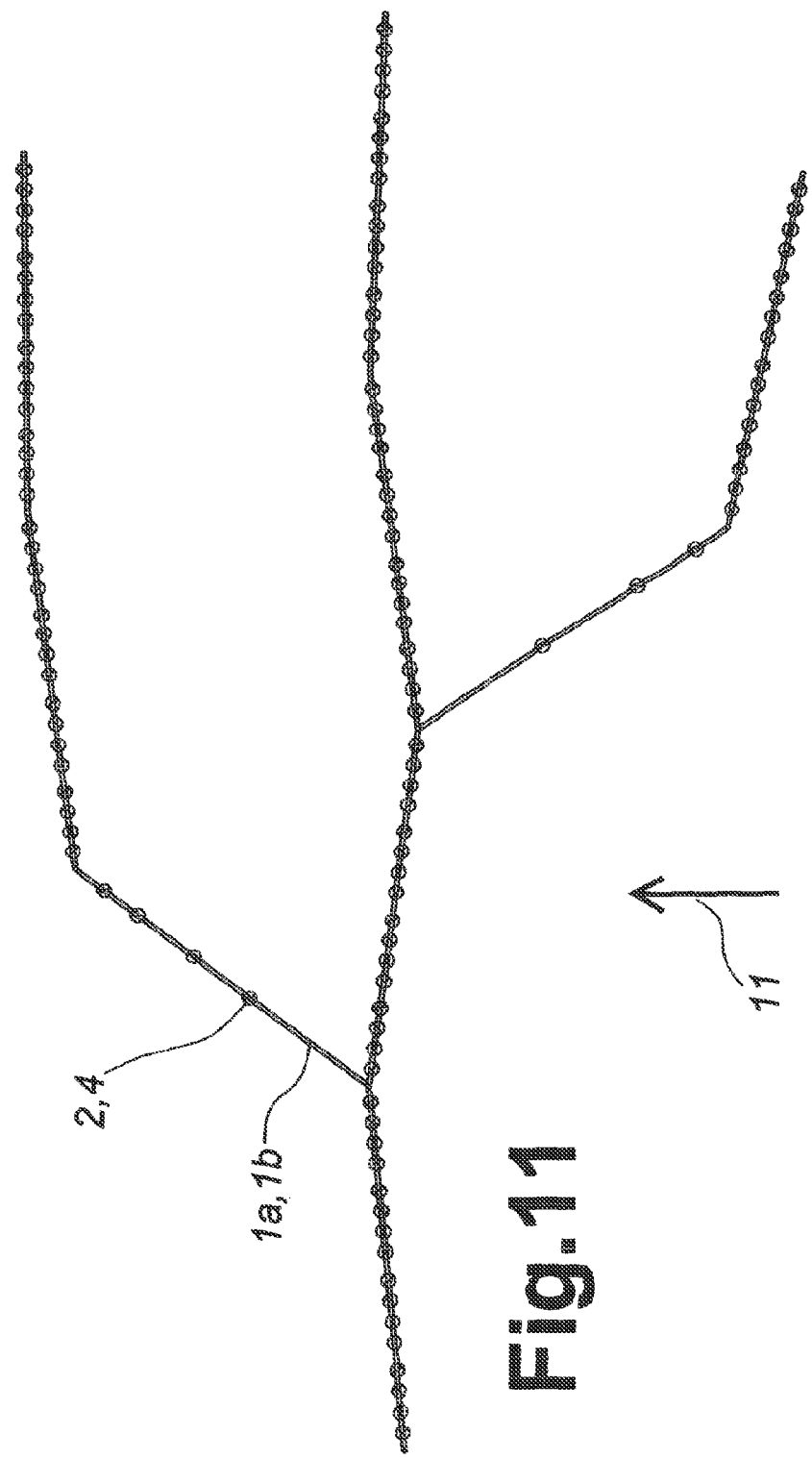

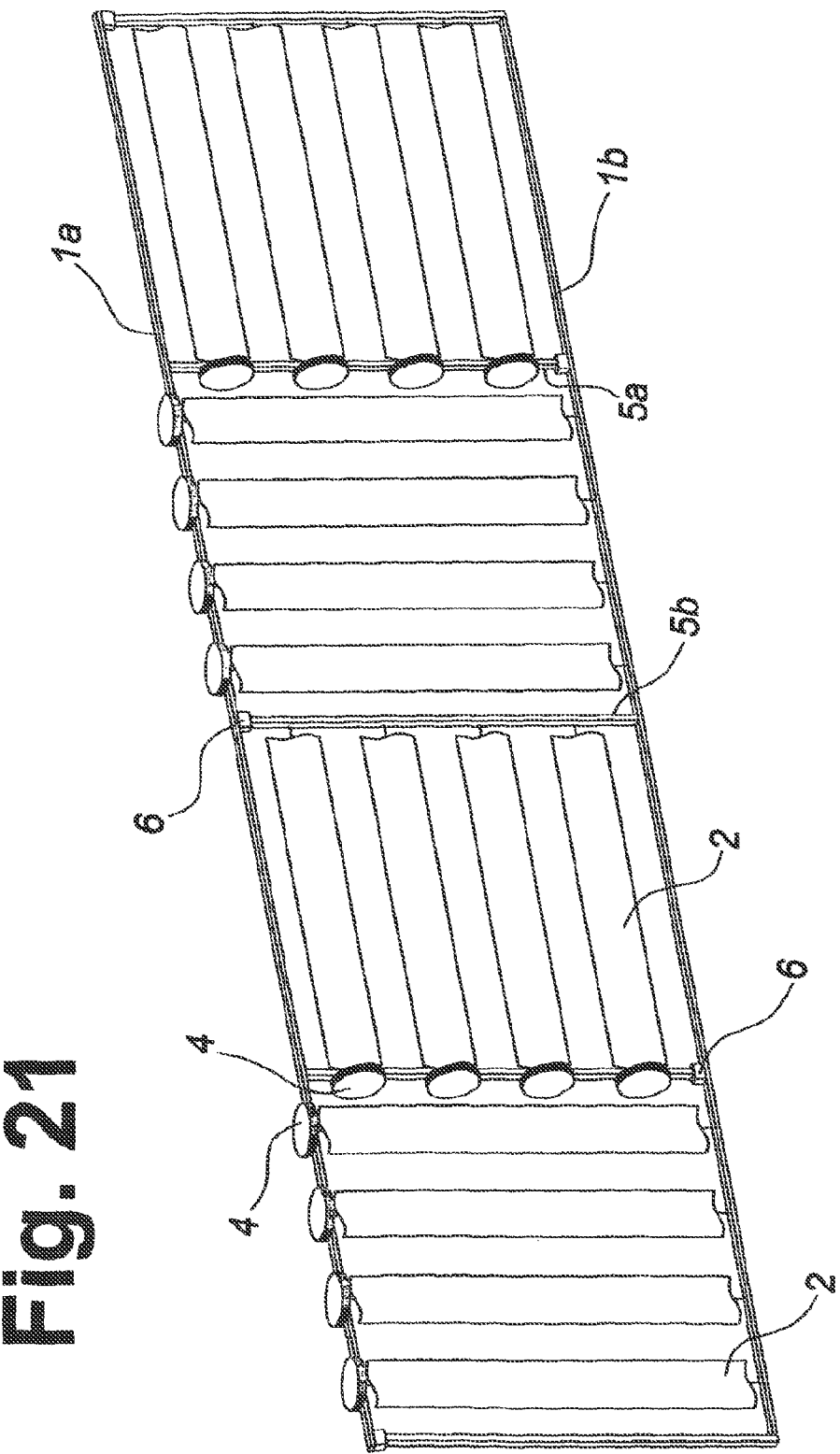

WIND TURBINE SYSTEM

CROSS-REFERENCE TO RELATED APPLICATIONS

The present application is the U.S. National Phase of International PCT Application Serial No. PCT/GB2011/000293, entitled "Wind Turbine System," filed Mar. 3, 2011, which claims priority to Great Britain Application No. 1002646.6, filed Feb. 17, 2010, each of which are hereby incorporated by reference in their entirety for all purposes.

FIELD AND BACKGROUND

This present disclosure relates to a modular wind turbine system suitable for the construction of wind farms.

The desirability of converting wind energy into electrical energy is well known, namely that the electricity is generated without the burning of fossil fuels, and thus without the associated carbon dioxide emissions.

Conventional wind farms, which consist of large scale horizontal axis turbine installations, suffer from a number of significant financial and environmental drawbacks: each turbine requires its own very tall and heavy steel tower, with extensive electrical cabling run from the turbine hub to the base of each tower and thence to a substation for onward power transmission. Massive tower foundations, new access roads capable of carrying heavy lifting equipment, and additional land drainage are also often required when a conventional wind farm is installed. Apart from the financial, energy and environmental costs of this additional infrastructure, the turbines themselves are often objected to by local communities due to their visual dominance of the landscape and production of visual "flicker" and low frequency noise, which can be perceived as a nuisance even at considerable distances from the installation, due to the height of the turbines above ground level. Environmental objections and physical access for turbine equipment and cranes constitute severe constraints on the range of locations where large onshore wind turbines may be deployed. Offshore wind turbines overcome the visual and noise objections, but suffer even larger installation and cabling/connection costs.

As an alternative to individual large turbines a number of systems have been proposed to mount arrays of smaller turbines on tall towers or large scaffolding-type frames on rotating platforms, in various patents and patent applications, for example U.S. Pat. No. 6,749,399 and WO2009130691. These designs, however, would suffer from many or all of the objections described above, particularly cabling costs, noise, and visual obtrusiveness. Additionally, rotating platform devices could require a relatively large footprint on the land they occupy.

A different approach has been to mount smaller turbines on buildings either singly or in arrays as, for example, described in U.S. Pat. No. 4,220,870 and WO2005052362. However, a number of studies have shown that the wind speed is so reduced, and turbulence so increased in the vicinity of most buildings, that the energy output of such arrays is likely to be minimal in most cases.

Smaller wind turbines on individual poles placed away from nearby buildings, tall trees or other obstacles produce a much better power output than equivalent building mounted ones. A variety of such machines are now commercially available, including both horizontal axis types, which need to have their rotation axis aligned with the wind direction for optimum efficiency and also "vertical axis" machines which are sometimes described as omnidirectional in that they are able to extract energy with moderate efficiency from wind arriving from any direction in a plane perpendicular to the axis of the turbine. Thus for certain wind directions a "vertical axis" machine will extract energy even if its axis is other than vertical. Conventional installations of individual horizontal or vertical axis machines still require the considerable additional energy, installation and financial costs both of the individual supporting poles or towers, which must be of sufficiently strong construction to withstand gale force winds from any direction, and of the additional electrical cabling or mechanical linkage required to take the power output of each individual turbine from its hub height to ground level and thence to the point of consumption or onward transmission. For low voltage systems, as are commonly used in smaller wind turbines with ratings of 10 kW or less, relatively high electric currents necessarily result when there is significant power output from the generators. Therefore the choice faced by the installer or user is either to invest in large cross-section, and hence expensive, connecting cables from the generator to the point of use or onward transmission, or to accept considerable energy losses due to resistive heating of the cables, if small diameter connecting cables are used.

Some proposals have been made for linear "wind fence" type constructions either at ground level or raised on poles as, for example, described in U.S. Pat. No. 5,642,984, U.S. Pat. No. 4,265,086, U.S. Pat. No. 2,218,867, and U.S. Pat. No. 1,876,595. As with individual turbines on poles, a key problem which arises with such a design is still how to take the energy from where it is harvested by the turbines to where it is to be used. Proposals have included mechanical or hydraulic linkages between the turbines and central power stations or generators, or that turbines have individual electrical generators, the electricity being taken to its point of use or transmission by cables. The use of cabling, hydraulic or mechanical linkages all add considerable cost and complexity to these designs. A second key concern, that of bracing the structure against strong winds, is addressed in some designs by using guy wires attached from the ground to various points on the structure. These would, however, significantly interfere with land use on many farm installations. The conventional alternative, of using individual sufficiently strong vertical poles at intervals implies, as with conventional wind turbines of equivalent swept area, relatively large and heavy poles, and therefore large cranes or similar heavy lifting mechanisms to raise the poles and to raise and attach the turbines to them.

Thus there remains a need for a lightweight and low cost wind farm system which requires minimum materials for its construction, minimizes or eliminates additional access and electrical connection infrastructure, and has minimum environmental impact.

SUMMARY

The present disclosure addresses the above need by the use of a lightweight interconnected modular array of wind turbines, mounted on a system of electrically conducting rails, beams or other structural forms, whereby the electrically conducting structural members combine the functions of carrying the weight of the turbines, the forces due to wind loadings, and of providing a full electrical circuit to convey the electrical power produced by the turbines to wherever it is required, thus reducing or eliminating the need for traditional cable runs.

One aspect of the present disclosure provides a system for capturing energy from the wind, comprising a plurality of modules, wherein each of said modules comprises:
one or more electrically conductive structural rails;

at least one wind turbine, supported by at least one of said electrically conductive structural rails; and, at least one electrical generator, driven by said at least one wind turbine, said at least one electrical generator comprising at least a first electrical terminal which is electrically connected to at least a first of said electrically conductive structural rails, and at least a second electrical terminal which is electrically connected to a separate electrical conductor that is electrically isolated from said first electrically conductive structural rail, said modules being electrically linked to one another such that each of said first electrically conductive structural rails is electrically connected to the electrically equivalent electrically conductive structural rail on at least one adjacent module such that the linked array of modules comprises at least one line of concatenated electrically conductive structural rails, said line of concatenated electrically conductive structural rails together with the said electrical conductor(s) being capable of conveying electrical energy from the wind turbine generators to a chosen location or locations for consumption, storage, or onward transmission of said electrical energy.

In some embodiments of the present disclosure, the said separate electrical conductor may comprise one or more electrically insulated cables, but in preferred embodiments the said separate electrical conductor comprises at least a second of the said electrically conductive structural rails.

In some preferred embodiments of the present disclosure, the said electrically conductive structural rails are arranged to be, in use, substantially horizontal, or substantially parallel to the ground or other surface on which the array of modules is located. It may however be possible that said electrically conductive structural rails are arranged to be, in use, upright, or substantially vertical, or substantially perpendicular to the ground or other surface on which the array of modules is located. Arrays may thus be contemplated that extend upwards, rather than along the ground or other surface on which they are mounted. The turbines may be arranged to rotate about axes that are non-vertical or even substantially horizontal, although substantially vertical turbine axes are generally preferred for their substantial independence of the wind direction.

Further, the relative positioning and orientation of the modules is preferably such that the mechanical strength of the array is maximized in the directions from which it will experience high wind loadings. Preferred embodiments of the present disclosure are configured to be raised on poles of less than 15 m height, and therefore to be visually unobtrusive compared to conventional wind farms, whose turbines may reach considerably more than 100 m in height. The arrays of modules according to preferred embodiments of the present disclosure are generally able to be erected from ground level by small teams of workers, preferably without the use of cranes, and able to be carried to, and within, sites where there are small access roads or even no access roads at all. The modular nature of the system also enables the relocation of individual modules and the addition, removal, or replacement of modules with relative ease.

BRIEF DESCRIPTION OF THE DRAWINGS

FIG. 1 is a perspective view of a wind turbine module constructed in accordance with the present disclosure.

FIG. 2 is a schematic side view of an individual wind turbine, an associated generator, and a section of the conducting rails of a module according to the present disclosure, illustrating a means by which the generator may be electrically connected to the conducting rails.

FIG. 3 is a schematic side view of similar components to those of FIG. 2, but illustrating an alternative means by which the generator may be electrically connected to the conducting rails.

FIG. 4 is a schematic side view of an array of modules similar to the module shown in FIG. 1, but raised on extension poles, and illustrating a means by which the modules may be electrically interconnected.

FIG. 5 is a perspective view of several wind turbine modules similar to that illustrated in FIG. 1 but with the addition of extension poles, illustrating how the modules may advantageously be laid out on a site, prior to being erected to form a linked array.

FIG. 6 is a perspective view of the modules shown in FIG. 5 after they have been erected, illustrating links between them such that they form an electrically and mechanically interconnected array which is braced in a direction parallel to the prevailing wind and perpendicular to the planes of the modules.

FIG. 7 is a plan view of an array of modules in a similar arrangement to that illustrated in FIG. 6.

FIG. 8 and FIG. 9 are plan views illustrating examples of other means by which the relative positioning of modules may be used to brace the entire array of modules against winds arriving approximately perpendicular to the modules.

FIG. 10 is a plan view showing an example of how arrays of modules may advantageously be constructed in which individual modules include conducting rails which are not straight.

FIG. 11 is a plan view illustrating a branched array of modules, and in which some of the modules may include different numbers and spacings of individual turbines.

FIG. 21 is a perspective view of a module which includes sets of turbines and generators in different orientations.

DETAILED DESCRIPTION

Figure 12:
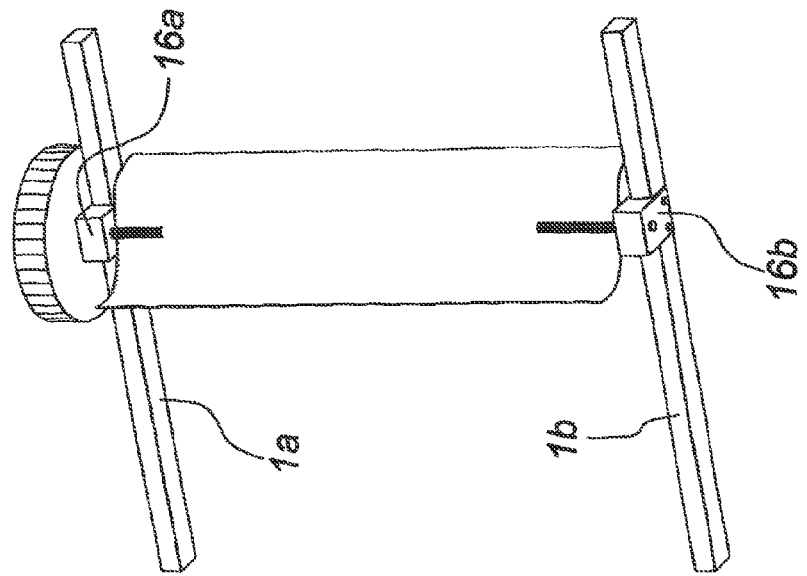
FIG. 12 is a perspective view illustrating a means by which the position of an individual turbine and generator may be adjusted along the conductive rails of a module.

A first aspect of the present disclosure provides an array of electrically linked modular units ("modules"), wherein each module comprises a plurality of electrically conducting elongated structural elements ("rails") which may take the form of metal rails, tubes, beams, bars, girders or other known structural forms, and at least one wind turbine supported by one or more of the rails. Preferably the rails are substantially horizontal or substantially parallel to the ground or other surface on which the array of modules is located. At least one of the rails is electrically isolated from at least one of the other rails in each module, but each current-carrying rail is electrically connected to the electrically equivalent rail or rails on the neighboring module or modules, for instance by jumper cables or connecting rails. The electrically conducting structural rails thus perform the combined functions of physically supporting an array of individual wind turbines and of conveying the electric power produced by electrical generators, which are themselves coupled directly or indirectly to the wind turbines, to locations designated for the consumption, storage or onward transmission of said electric power. Preferably the electrically conducting structural rails are fabricated from aluminum, or an alloy containing a high proportion of aluminum. Aluminum and many of its alloys possess the desirable characteristics of having both high strength to weight ratios, and very high ratios of electrical conductivity to both weight and cost compared to other known materials, making them ideal for structures such as those of the present disclosure, which need to be strong, light in weight, low in cost, and highly electrically conductive. Aluminum and its alloys are also readily available as extruded lengths with many cross-sectional forms suitable for the application described in the present disclosure, such as box sections, beams and tubes. Additionally, they generally possess very good corrosion resistance, therefore not requiring painting or maintenance in outdoor applications such as the ones envisaged in the present disclosure.

Another aspect of the present disclosure is that neighboring modules, preferably raised to a height of at least several meters above ground level on upright supporting poles, are preferably arranged relative to one another such that the shape of the array of connected modules braces the structure effectively against winds arriving from directions substantially perpendicular to the modules, to an extent where the bracing obviates the need for guy wires or heavy supporting poles.

Further, each module may be connected to more than two other modules such that, for instance, branching lines of modules may be formed and these, in turn, may be connected to other lines of modules.

It is envisaged that lines and networks containing any number of modules may be produced in this way, containing arrays of any number of turbines, all electrically linked to a common set of electrically conducting rails, said rails conveying the electricity produced by generators, coupled to the turbines, to whatever point or points are convenient for the use, storage or onward transmission, for example via the national grid, of that electricity.

A further aspect of the present disclosure is that each module may be fixed to a pair of supporting poles, one at each end of the module, each supporting pole itself being hinged at its other end to a ground attachment point. Each module is preferably of a size and weight which enable it to be raised into position by a small group of workers, either manually, with a winch or by other simple, ground operated means but preferably without the need of a crane or other heavy lifting equipment.

By combining the conveying of electrical power and the structural support functions in this way the system minimizes or eliminates the use of electrical cable runs. Thus weight, cost, manufacturing materials and energy input for the electricity conveying components are all minimized. Similarly, by combining adjacent modules of the system in a configuration where they collectively strengthen the structure to a maximum extent in the directions from where it will experience the highest wind loadings, namely perpendicular to the planes of the modules, the additional weight and installation complexity associated with heavy support poles or external bracing such as guy wires may be eliminated.

FIG. 1 is a perspective view of an individual module for assembly into an array of such modules according to a preferred embodiment of the present disclosure. Each such module in this preferred embodiment has first and second electrically conducting, mutually electrically isolated structural rails, $1a$ and $1b$, each of said rails being installed either in a substantially horizontal orientation or substantially parallel to the ground or other surface on which the array is placed, and the pair of said rails preferably lying in a substantially vertical plane such that one rail is substantially above the other and advantageously also being oriented substantially perpendicular to the prevailing wind direction in the vicinity of the module. Disposed between said rails in each module is an array of vertical axis wind turbines 2, each rotatably coupled to rails $1a$ and $1b$, via shafts $3a$ and $3b$ respectively. The rotatable couplings incorporate bearings, said bearings being omitted from the drawing for clarity. In FIG. 1 and subsequent illustrations, the profile of the wind turbines 2 as illustrated is not necessarily representative of the actual turbine profile to be used in practice. The detailed design and actual blade profiles of the individual turbines may, for example, be selected from a variety of known designs. The turbines may be of known two bladed or three bladed types, but preferably are of a "self starting" design in that each turbine possesses the capability to reach its optimum operating rate of rotation from the wind flow only, without an initial requirement for a driving motor to spin it up to speed. An example of a suitable profile for the blades of said vertical axis turbines is that described in the U.S. Pat. No. 5,494,407, said profile being relatively efficient, strong, and straightforward to construct from lightweight sheet materials, the preferred material for construction of the blades in the present disclosure being aluminum or an aluminum alloy. The bearings may be of any known type, but standard sealed ball bearing assemblies of suitable dimensions are preferred. Each individual wind turbine 2 preferably directly drives an individual electrical generator 4, said generators preferably being mounted onto one of the conducting structural rails, as illustrated in FIG. 1, although other arrangements where the turbines indirectly drive generators via gears or other means, including arrangements in which multiple turbines are linked to single generators or in which multiple generators are linked to single turbines, are also possible within the scope of the present disclosure.

Although the electrical generators may produce alternating or direct current, in preferred embodiments each generator comprises an air cored radial or axial flux permanent magnet alternator unit with full wave rectifier circuitry integrated into said unit such that the final output of the generator is direct current (DC).

In the context of this discussion of the present disclosure, the term "generator" is understood to include a unit consisting of an electrical alternator connected to a rectifying circuit or device, so as to produce a DC output. The two output terminals of such a DC generator are then electrically connected to rails $1a$ and $1b$ respectively, and each of said DC generators in each module is electrically connected to rails $1a$ and $1b$ in the same electrical sense, such that the entire array of DC generators for each module is thus connected in parallel. In some advantageous embodiments of the present disclosure, the generators are of a "low voltage" type, such that the maximum output voltage is less than 100V, preferably less than 50V. The installations may, for instance, in the latter case be considerably safer if it is required for personnel to work with the modules whilst the rails are at their rated operating voltage. For some applications where, for example, it is required to minimize resistive heating losses in the electrically conducting rails for very long runs of modules, higher voltages may, however, be preferred.

In order to link the two electrically conducting rails $1a$ and $1b$ mechanically to one another to form a rigid frame, structural tie rails may be used, $5b$ in FIG. 1. Preferably the tie rails are themselves electrically conducting, and may be of similar cross-sectional shapes to the conducting rails $1a$ and $1b$ and, preferably, also made of aluminum or an aluminum alloy. It is, however, necessary that the tie rails do not electrically connect rail $1a$ with rail $1b$, since rails $1a$ and $1b$ must remain mutually electrically isolated. To this end, insulating pieces 6 are employed, interposed in the preferred embodiment between tie rails $5b$ and at least one of the conducting rails $1a$ or $1b$.

In the above mentioned preferred embodiment, the electrical connection between the electrical generators and the conducting rails $1a$ and $1b$ is conveniently achieved as illustrated schematically in FIG. 2. One terminal on the DC generator is electrically linked to the conducting rail $1a$ to which the generator is attached, either directly or via a short connecting cable $7a$. The other terminal is electrically linked to the conducting rail $1b$ by means of another short connecting cable $7b$, electrically connected to a nearby electrically conductive tie rail $5b$, itself electrically connected to conducting rail $1b$ but electrically isolated from conducting rail $1a$. Alternative arrangements are, of course, possible, for example the connecting cable $7b$ may be routed through or along the tie bar $5b$. The connecting cables referred to above may be of relatively small cross section as they need carry only the current output of a single generator, said current being typically a few amps, whereas the electrically conducting rails $1a$ and $1b$, with potentially many generators connected, may have to carry many hundreds of amps at times of peak output. Another example of a possible configuration for electrical connection of the generator to the conducting rails $1a$ and $1b$ is one in which there are no external connecting cables leading from the generator, but where instead the electrical connections are all made within the generator/turbine assembly, as illustrated in FIG. 3. In this case, the electrical link from the generator to conducting rail $1a$ is made directly, possibly as part of the mechanical attachment of the generator to the rail $1a$, and the link to conducting rail $1b$ is made via the turbine $2b$ itself where, in the example illustrated, the turbine and its associated shafts are made from a conductive material. Such an arrangement would require suitable rotatable electrical couplings between the generator and the turbine $2b$ as well as between the turbine $2b$ and the conducting rail $1b$. These might be achieved either using suitably designed electrically conductive bearings or by other means, such as slip rings on the turbine shafts: In the examples shown in FIG. 1, FIG. 2, FIG. 3 and in subsequent figures, care needs to be taken that the means of providing the rotating mechanical attachment of the turbine to conducting rails $1a$ and $1b$ do not themselves provide a direct electrically conductive path between conducting rails $1a$ and $1b$. Suitable insulating housings for the bearings, insulated turbine shafts or other means could achieve this objective.

In the examples illustrated in FIG. 2 and FIG. 3, the positive terminal of the generator is connected to the top rail $1a$ and the negative terminal to the bottom rail $1b$. The opposite connection polarity is also acceptable, the important consideration being that each generator in the array should be electrically connected to conducting rails $1a$ and $1b$ with the same polarity as all the other generators. One of the two rails $1a$ or $1b$ may also be electrically connected to ground so as to be maintained constantly at earth potential. It may, for example, be beneficial to maintain one of the conducting rails at earth potential to assist in protecting the array in the event of a lightning strike. Other electrical connection configurations, such as pairs or groups of generators being connected in series, the resulting higher output voltages of each group then being connected in parallel via the electrically conducting rails, can also be envisaged.

FIG. 4 is a schematic side view showing part of an array of modules linked to form a fence. The electrical linkages $8a$ and $8b$ between rails on adjacent modules in the array are shown and, in this example, the modules are also raised on upright supporting poles 9. Each conducting rail $1a$ is linked to neighboring conducting rails $1a$ by electrically conducting linkages, which may take a variety of forms, including short flexible jumper cables $8a$ as illustrated or, in a preferred embodiment, by short structural connecting rails. As with conducting rails $1a$, conducting rails $1b$ may be electrically linked to neighboring conducting rails $1b$ by a variety of means, for example by short flexible jumper cables $8b$ or, in a preferred embodiment, by short structural electrically conducting rails. As well as the electrical linkage there would preferably also be some additional mechanical linkages between the neighboring modules, these mechanical linkages will be discussed in more detail below and with reference to subsequent figures.

FIG. 5 shows how several modules of the above mentioned preferred embodiment of the present disclosure, with poles attached, may advantageously be laid out on the ground or other surface 10 in preparation for being raised on supporting poles 9 to their operating height and subsequently linked together. Ideally, the modules are oriented such that, when raised, the plane of the majority of the modules is substantially perpendicular to the direction 11 of the prevailing wind at the site where the array is installed, although it is anticipated that each module will capture useful amounts of wind energy over a range of wind directions with the exception of those approximately parallel to the plane of the module. In preferred embodiments, each module is fixed to a pair of extension poles 9, one at each end of the module, said poles preferably being attached by hinge mechanisms to foundations 12, said foundations being metal plates, short poles or other structures themselves attached, or driven into, the ground, or weighted down in such a way as to be immobile. Each module is raised into its operating position above the ground by rotating the assembly, comprising a module attached to two poles, about the hinging points located at the foundations, until it the assembly is in an upright position as shown by direction arrows $13a$ and $13b$. Once upright, each module is preferably connected mechanically and electrically to its neighbors.

A perspective view of a preferred embodiment of the modular array structure thus created is illustrated in FIG. 6, wherein adjacent modules are connected by short structural rails 14, some of which may primarily serve mechanically to connect and brace the structure, others of which 14a, 14b mechanically brace the structure and simultaneously electrically connect the corresponding electrically conducting rail, $1a$ or $1b$ respectively, to which they are initially attached, to the electrically equivalent conducting rail on an adjacent module. It should be noted that, in FIG. 6, the turbine at the right hand end of the central module has been removed from the illustration for clarity, in order to enable the structural and conducting rails to be seen more clearly. The structure as illustrated in FIG. 6 achieves high strength in a direction parallel to the prevailing wind direction, by virtue of the upright supporting poles 9 of any two adjacent modules being offset relative to one another, and linked by connecting rails 14, collectively forming a two dimensional braced frame or lattice structure in a plane substantially parallel to the prevailing wind direction 11.

FIG. 7 is a plan view of an array of offset modules similar to that shown in the perspective view of FIG. 6. In addition to the example illustrated in FIG. 6 and FIG. 7, there are other means by which the array of modules may be strengthened without necessarily offsetting the modules in the way described above.

FIG. 8 is a plan view of a zig-zag or corrugated arrangement of modules, which achieves high strength in a direction approximately perpendicular to the line of modules by virtue of the characteristic that any three neighboring upright supporting poles form a tripod, rather than being coplanar. Likewise, as illustrated in the plan view of FIG. 9, an array of modules which follows a curve has increased strength compared to a planar two-dimensional array of non-offset modules and poles, for similar reasons to those discussed above in regard to the arrangement illustrated in FIG. 8, even if adjacent modules share poles rather than each module being raised independently on a pair of poles. Even though the arrangements of FIGS. 8 and 9 would result in not every module being precisely perpendicular to the prevailing wind, the benefits of the strength increase may be sufficient to justify this slight reduction in efficiency. Further, it may be desirable to follow the curves of contour lines around hillsides, both for aesthetic reasons and to keep longer arrays approximately horizontal and with their supporting poles having approximately the same length, facilitating assembly. This departure of the macroscopic form of the arrays of modules from a planar structure, optionally combined with the technique of offsetting of neighboring arrays as illustrated in FIG. 7 and described above, will be of considerable benefit to the overall strength of the arrays of modules.

FIG. 10 is a plan view of an array of modules similar to that of FIG. 8, but in which the electrically conducting rails of each individual module are curved, and where the direction of the curvature alternates between adjacent modules. The arrangement shown in FIG. 10 could impart some benefit in withstanding strong winds, compared to modules with completely straight rails. Straight rails, if of relatively low rigidity, could tend to become noticeably curved in very strong winds, due mainly to the wind loading on the turbines attached to them, thus tending to draw together the upright supporting poles 9 at each ends of each rail, possibly distorting the array as a whole. In the arrangement of FIG. 10 pairs of conducting rails 1a, 1b which are concave when viewed from the direction from which the oncoming wind arrives will tend to draw upright supporting poles together slightly, but pairs of rails which are convex will tend to push the upright poles apart slightly so that, as long as the upright poles have sufficient flexibility or a hinging arrangement which allows them to bend slightly in a direction approximately parallel to the line of the array, the resulting distortions could largely be cancelled out locally between any two neighboring modules and not passed along the length of the array. Other arrangements of conducting rails which are not straight may also be envisaged for example where bends or steps in the rails are in a vertical plane if, for example, it is desired to keep individual wind turbines vertical in a module which is installed on a slope.

FIG. 11 is a plan view of a branched array of modules, as may be formed by connecting some individual modules to more than two others. As well as further strengthening the overall array, this structure has the advantage that it can conveniently channel the electrical energy from a number of lines of modules to a single collection point. Lines of modules may, for example, be arranged in a series of terraces on a hillside, or spaced apart in a flat field, and it may be desirable to take the electricity from those lines of modules to a single consumer, storage facility, or substation for onward transmission. Rather than laying cables from the end of each line of modules it may be more cost effective and convenient to connect them electrically with additional lines of modules, increasing the generating capacity of the overall array of modules in the process. In FIG. 11 it is noted that modules which are in a relatively unfavorable orientation or position with respect to the prevailing wind direction 11, contain fewer individual turbines and generators 2, 4. This may be a more economic solution than installing a higher density of turbines on modules in such unfavorable orientations, wherein individual turbines might shelter other turbines from the prevailing wind to an unacceptable extent if installed at higher density. In occasional extreme cases it may be advantageous to use a few connecting sections comprising conducting rails with no turbines at all on them.

Figure 13:
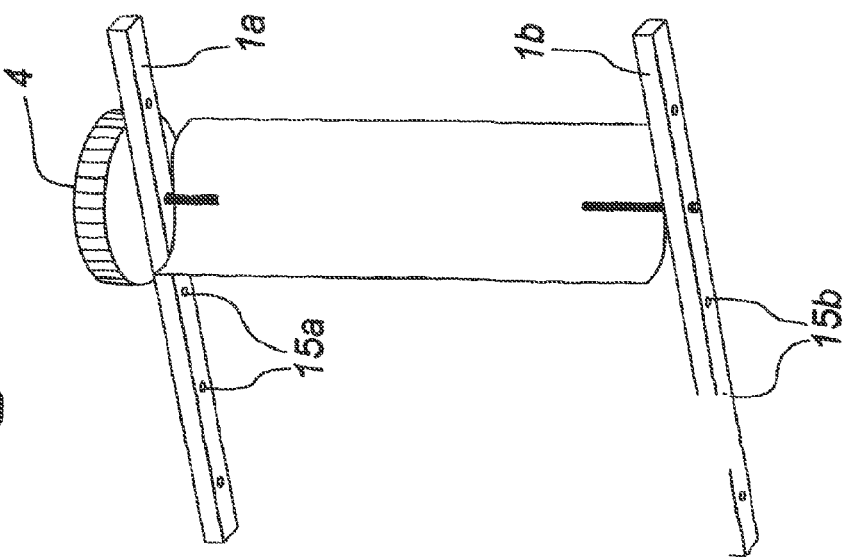
FIG. 13 is a perspective view illustrating an alternative example of a means by which the position of an individual turbine and generator may be adjusted along the conductive rails of a module.

Means by which the spacing of individual turbines within a module may conveniently be adjusted for the above reason, or for other reasons, for example the sheltering of part of an array by buildings, are illustrated in perspective views in FIG. 12 and FIG. 13. FIG. 12 shows how there could be relatively closely spaced lines of holes 15a, 15b, within the electrically conducting rails 1a and 1b, enabling turbines and generators to be sited at a range of discrete positions. FIG. 13 illustrates an arrangement in which the turbine, generator and bearings are mounted on sliding blocks or clamps 16a, 16b, which can be fixed at any desired position along the conducting rails 1a and 1b.

Figure 14:
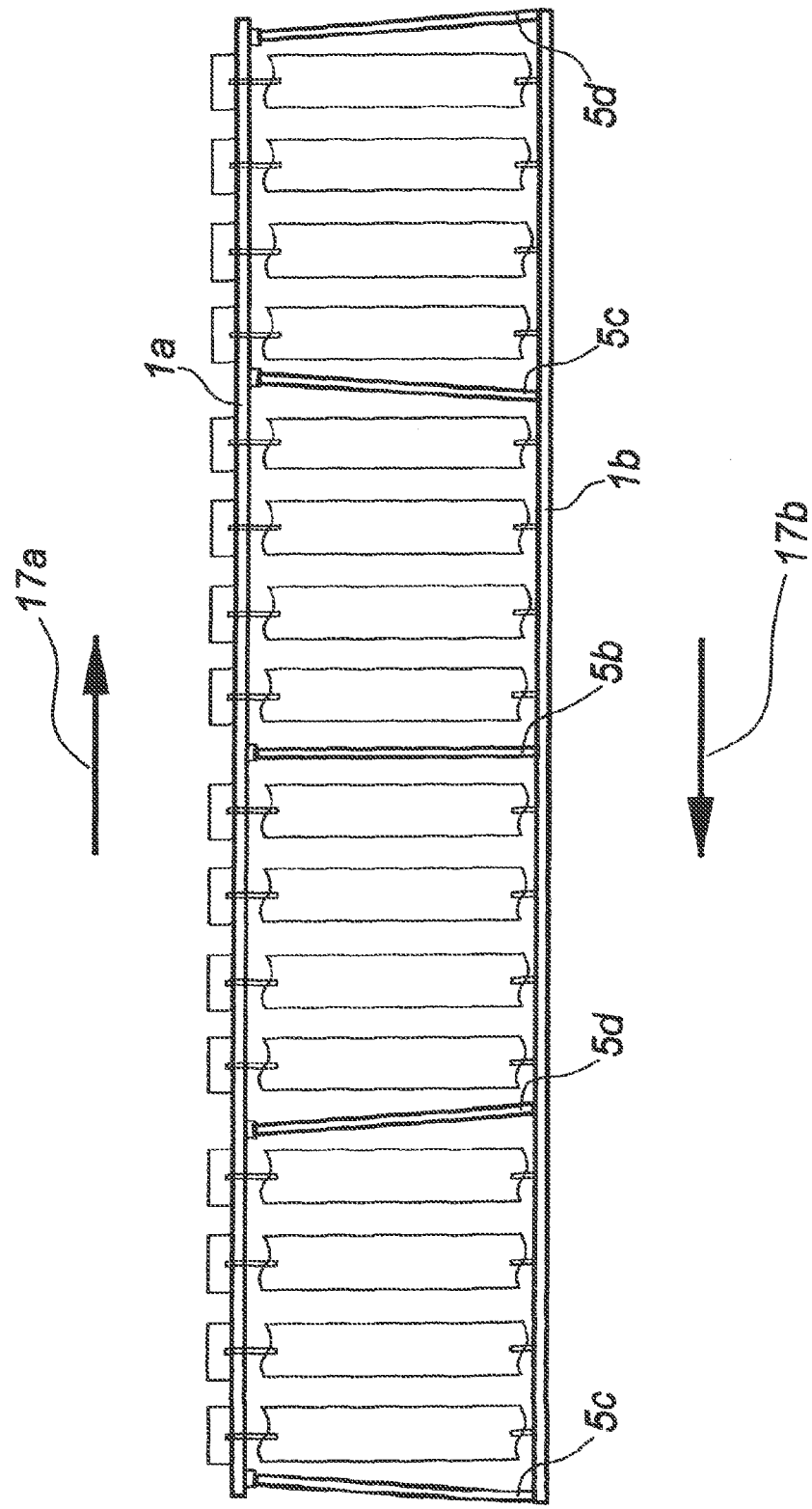
FIG. 14 is a schematic side view of a module according to the present disclosure, illustrating a means by which an individual module may be braced against mechanical shear forces in the plane of the module.

In addition to the mechanisms described above for bracing arrays of modules against strong winds, it may be desirable to brace individual modules against shear forces parallel to the plane of the modules, which may occur for instance during assembly of the arrays or, to some extent due to strong winds occasionally blowing parallel to the plane of the modules. There are a number of ways in which such reinforcement could be achieved, but a convenient means to achieve it without adding extra structural pieces is illustrated as a schematic side view in FIG. 14. In this example, the tie rails 5c and 5d are deliberately oriented so that they are not perpendicular to the main rails 1a and 1b, and so that tie rails 5c are not parallel to tie rails 5d. Relatively small deviations of these tie rails either side of a perpendicular position should be sufficient to ensure that shear forces 17a, 17b acting on the module will not distort it significantly.

Figure 15:
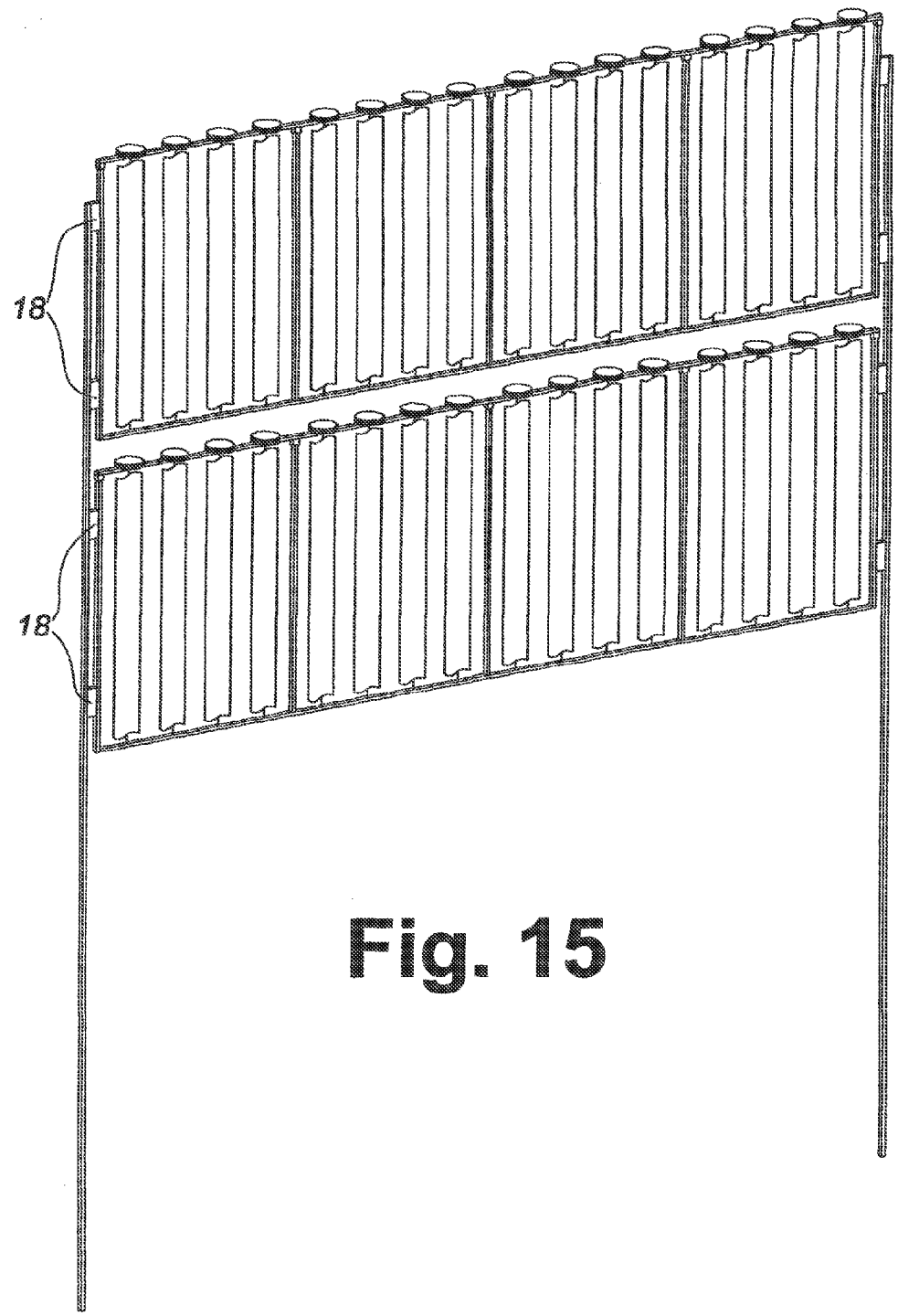
FIG. 15 is a perspective view illustrating modules arranged in more than one tier on common supporting poles.

All the above described examples of the present disclosure have illustrated embodiments in which a single row of turbines and a single pair of conducting rails are used. It may be desirable in some locations and circumstances, however, to deploy multiple rows of turbines sharing the same supporting poles, for example to extract more energy from the wind at a particular site of limited ground area. FIG. 15 is a perspective view illustrating one embodiment of such an arrangement, featuring two modules one above the other. This particular example involves two pairs of rails 1a and 1b, which may, for example, be electrically connected in parallel or in series. Sets of spacers 18 may be interposed between the modules and the supporting poles, said spacers being electrically insulating in the illustrated example if it is desired not to connect the rails 1b of the two modules to one another electrically, the spacers 18 optionally being electrically conductive if parallel connection of the two modules is required. Other arrangements involving multiple rows of turbines are possible within the scope of the present disclosure, including ones in which a middle rail is shared by two rows of turbines, and ones in which one row of turbines is not directly above another row, but is instead offset.

Figure 16:
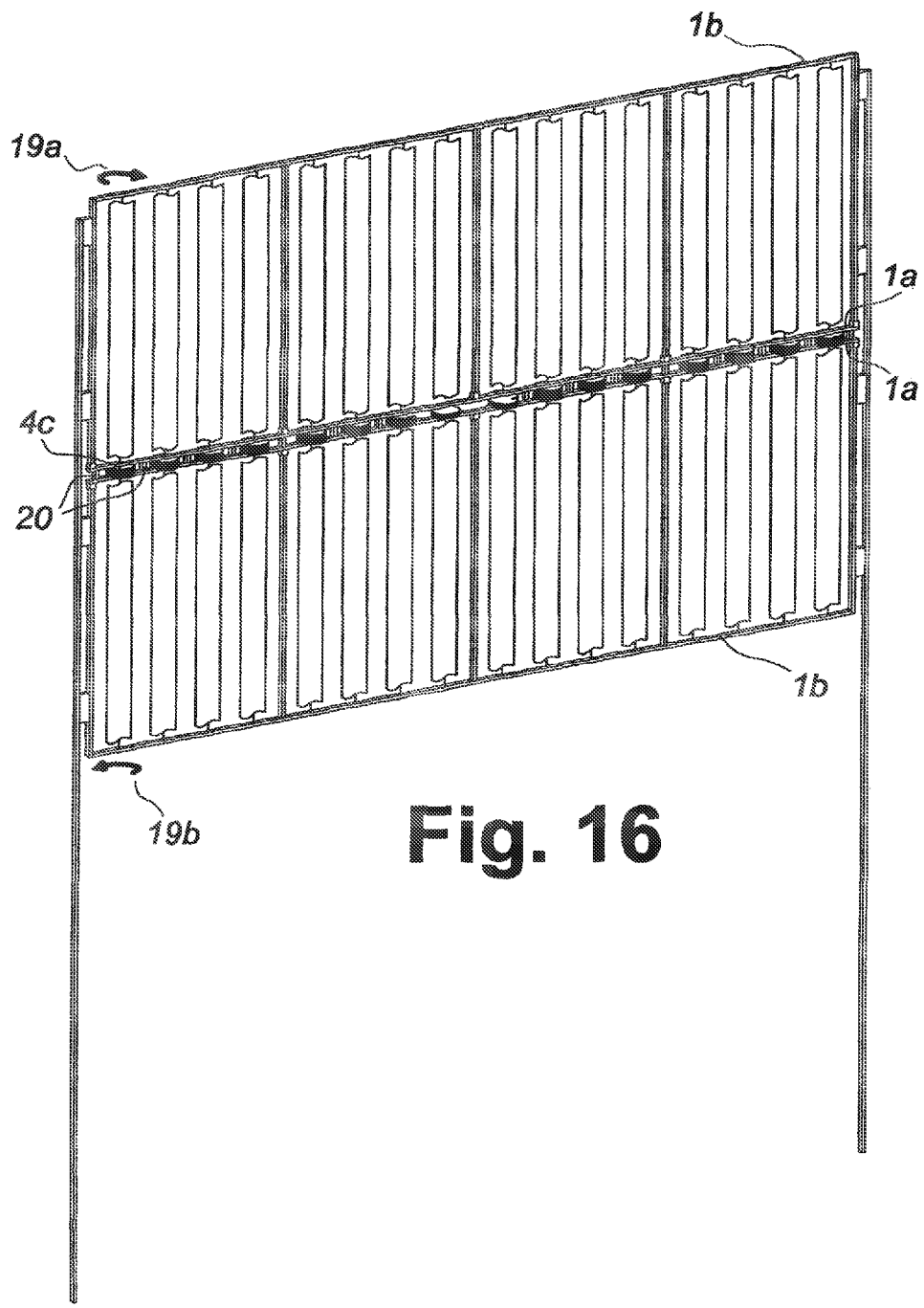
FIG. 16 is a perspective view illustrating how turbines within a module may be configured in pairs, with each pair driving a shared electrical generator.

FIG. 16 is a perspective view illustrating an example where the use of two rows of turbines may be particularly beneficial. In this advantageous embodiment, the two rows are arranged so that each turbine in the top row rotates in the opposite direction 19a from the rotation direction 19b of the turbine in the row below, thus forming pairs of counter-rotating turbines. Each such pair of turbines preferably shares a single permanent magnet generator 4c. One turbine in the pair directly drives an array of magnets, and the other half directly drives an array of electrically conductive coils in the opposite rotational direction, the coils preferably being connected to a full wave rectifier circuit also rotated by the turbine, the DC output terminals of the rectifier electrically connected to the conducting rails 1a and 1b via rotating electrical couplings. In the example of FIG. 16, the rails immediately above and below the generators may be of type 1a, in other words of the same polarity. They may then be mechanically and electrically connected to one another with very short tie rails 20, forming a rigid sub-frame for the generators and bearings which may assist with generator alignment. In this case the uppermost and lowermost rails 1b as illustrated in FIG. 16 may be at the same polarity as one another.

The embodiment of FIG. 16 has the advantage that the rotational speed of the array of magnets relative to the array of coils is effectively twice that in a generator directly driven by a single turbine of similar design, in which only the array of magnets is rotated, and in which the array of voltage generating coils, the stator coils, is fixed. Thus, for the same turbine rotation speeds, each generator connected in the above described way to a pair of turbines, can produce twice the voltage and hence four times the power output of a similar generator directly driven by a single turbine. The equivalent rotation speeds to the single turbine case would only be achieved in reality, though, if the wind turbines as illustrated in FIG. 16 were themselves oversized relative to the generator such that they could deliver the required power input to the shared generator without being slowed inordinately by the additional load required to drive such a generator. In practice, the benefit of the configuration described above and illustrated in FIG. 16 is that it enables smaller or fewer generators to be used for a given swept area of wind turbine blades, thus saving on generator materials and fabrication costs.

Figure 17:
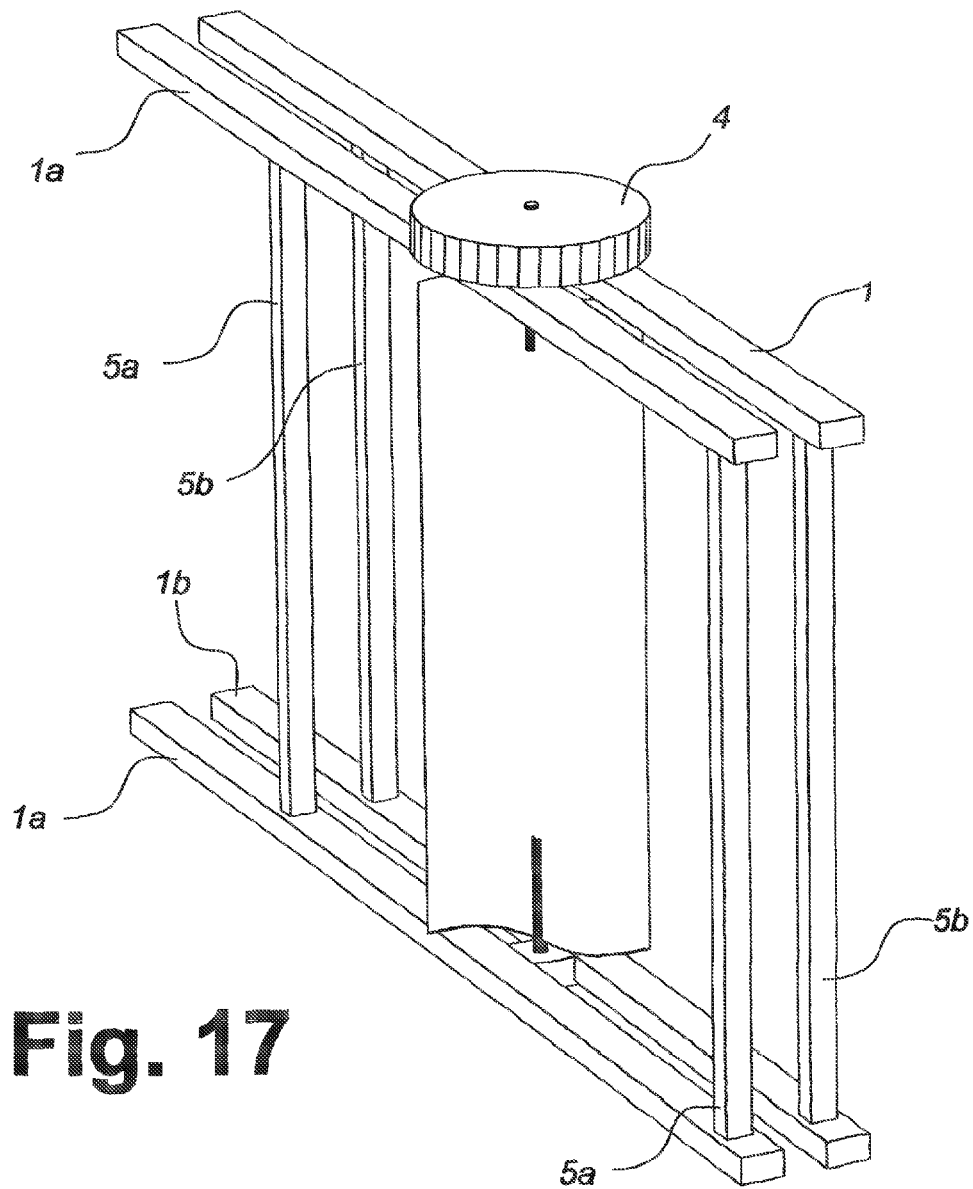
FIG. 17 is a perspective view illustrating a module frame configuration in accordance with the present disclosure, whereby rails are arranged in mutually electrically isolated parallel frames.
Figure 20:
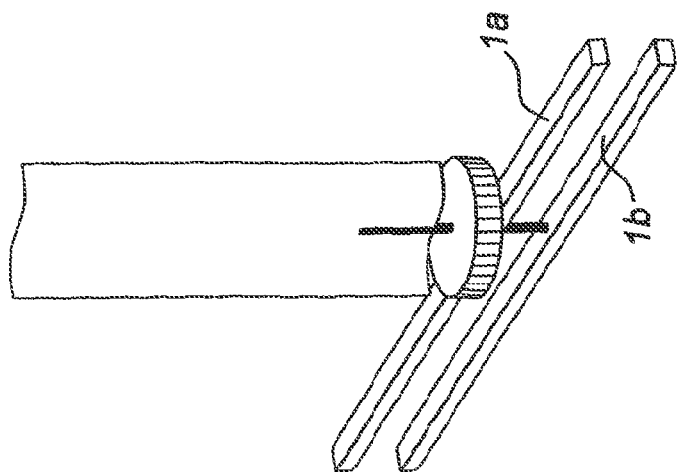
FIG. 18, FIG. 19 and FIG. 20 are perspective views illustrating several examples of possible further arrangements of conductive rails in accordance with the present disclosure.
Figure 19:
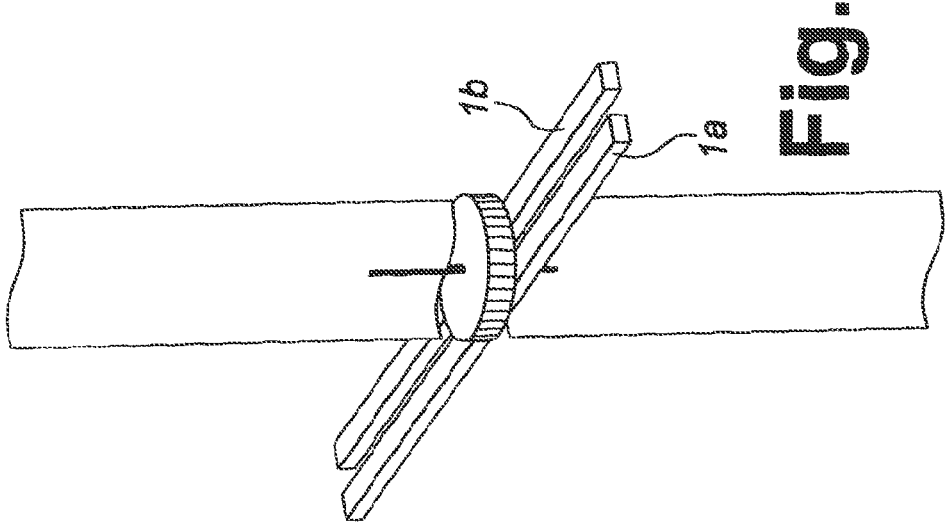

In addition to those module and array designs described in the above embodiments, many other arrangements of conducting rails, turbines and generators are possible within the scope of the present disclosure. A few such possible alternative configurations are illustrated in FIGS. 17 to 21. In FIG. 17, the conducting rails form two mutually electrically isolated frames, with turbines disposed between the conducting rails and between the frames. Although this arrangement requires more conducting rails than the arrangement of FIG. 1, each conducting rail in FIG. 17 can be of smaller cross section than each conducting rail of FIG. 1 consistent with the system illustrated in FIG. 17 nevertheless maintaining the required strength and electrical conductivity. An advantage of the arrangement illustrated in FIG. 17 is that the electrical generator may more readily be connected directly to conducting rails 1a and 1b.

Figure 18:
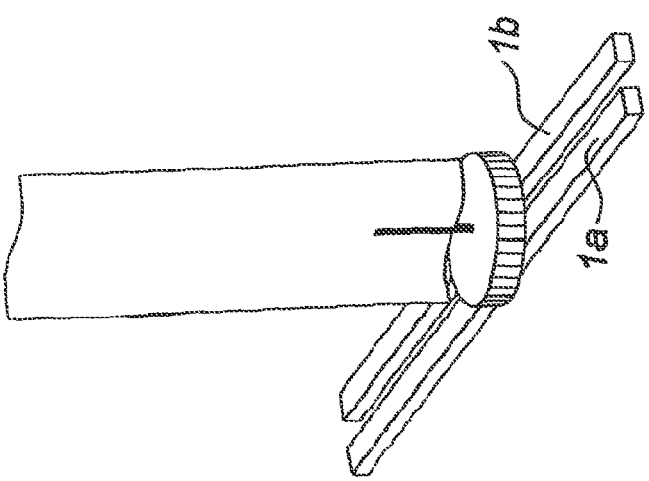

FIG. 18 also illustrates an arrangement where conducting rails 1a and 1b are side by side, but in this case with no rails above or below. In such a case a sufficiently rigid turbine blade design would be required that the blade could maintain itself in position with only a single rotatable shaft below it, and the rotatable shaft would require a much more robust attachment mechanism to the conducting rails 1a and 1b than would be required for a blade supported by rails at both ends, due to the bending moment applied to the rotatable shaft during strong winds. Such limitations might be mitigated by the design shown in FIG. 19, in which blades extend, on a common shaft, both above and below the plane of the conducting rails 1a and 1b, to balance the above mentioned bending moments. The alternative design illustrated in FIG. 20 also has some similarities to that of FIG. 19, but in the case illustrated in FIG. 20 the rails are placed one above the other, and the turbine shaft extends between them, to some extent alleviating the issue of the bending moment on the shaft during strong winds.

FIG. 21 is a perspective view illustrating a design similar to that shown in FIG. 1, except that some of the "vertical axis" wind turbines and associated generators are arranged with their axes horizontal. In fact, it would be possible for all the turbines in an array to be arranged in this configuration, which might be preferred for aesthetic reasons in some locations, and which might give efficiency advantages for some specific designs of turbine blade when the wind direction was other than directly perpendicular to the plane of the module. Further designs incorporating blades of different sizes, shapes and orientations within the same module or the same array, modules with non-parallel conducting rails, and other modifications may all be desirable due to requirements and circumstances at particular locations. It will be appreciated that, as well as the above described embodiments and examples, further designs and modifications will be possible which nevertheless fall within the scope and spirit of the present disclosure.

The invention claimed is:

1. A system for capturing energy from wind, comprising a plurality of modules, wherein each of said modules comprises:
   a rigid frame;
   a plurality of electrically conductive structural rails forming part of said rigid frame, said plurality of rails comprising at least a first rail which is electrically isolated from at least a second rail in each module;
   at least one vertical axis wind turbine, supported by at least one of said electrically conductive structural rails;
   at least one electrical generator, drivable by said at least one wind turbine, said at least one electrical generator comprising at least a first electrical terminal which is electrically connected to at least said first rail, and at least a second electrical terminal which is electrically connected to at least said second rail;
   a plurality of upright support poles, said modules being raised on said upright support poles; and
   a plurality of electrical linkages, said modules being electrically linked to one another by said electrical linkages such that each of said first and second electrically conductive structural rails is electrically isolated from at least one of the other rails in each module, but electrically connected to the electrically equivalent electrically conductive structural rail on at least one adjacent module such that a linked array of said modules comprises lines of concatenated electrically conductive structural rails, said lines of concatenated electrically conductive structural rails being adapted to convey electrical energy from the wind turbine generators to a chosen location or locations for consumption, storage, or onward transmission of said electrical energy.

2. The system according to claim 1, wherein said electrically conductive structural rails are arranged to be, in use, substantially horizontal, or substantially parallel to the ground or other surface on which the array of modules is located.

3. The system according to claim 1, wherein each module, in service, is raised above the level of the ground or away from any other surface on which the array of modules is located, by means of a pair of the upright support poles, one end of a first upright support pole of the pair of upright support poles being fixedly attached to a proximal end of said module, and one end of a second upright support pole of the pair of upright support poles being fixedly attached to a distal end of said module.

4. The system according to claim 1, wherein each module is substantially planar, and wherein in use the majority or all of said modules, or lines of modules, in an array is or are oriented substantially perpendicular to the prevailing wind direction.

5. The system according to claim 1, wherein the at least one vertical axis wind turbine captures energy substantially equally efficiently from wind arriving in any direction substantially perpendicular to an axis of rotation of the turbines.

6. The system according to claim 1, wherein said at least one electrical generator comprises a plurality of electrical generators which produce direct current outputs, said direct current outputs being electrically connected to one another in parallel by means of connections to the first and second rails of each module.

7. The system according to claim 6, wherein for each module, one of said first and second rails is substantially above the other of said first and second rails, and a plurality of vertical axis wind turbines are disposed between said first and second rails, each of said turbines being rotatably connected both to the rail above it and to the rail below it, and each of said turbines directly driving a coaxial electrical generator, said generator producing a direct current output and being electrically connected, via connections to said first and second rails, in parallel with all the other electrical generators in the array of modules.

8. The system according to claim 1, wherein the electrical linkages are made from aluminum or an aluminum alloy.

9. The system according to claim 1, wherein adjacent modules are non-coplanar and are mechanically interconnected, such that resistance to wind loadings of the array of modules, in directions substantially perpendicular to the plane of any individual module, is higher than would be the case for a coplanar array of modules.

10. The system according to claim 9, wherein each module is offset relative to immediately adjacent modules in a direction substantially perpendicular to the plane of said module, and wherein adjacent modules are connected to one another by structural rails.

11. The system according to claim 9, wherein adjacent modules form a corrugated arrangement when seen from above, such that any three adjacent points of connection between modules are non-coplanar.

12. The system according to claim 9, wherein points of connection between modules, when seen from above, lie on a curve, such that any three adjacent points of connection between modules are non-coplanar.

13. The system according to claim 1, wherein at least one module is connected to more than two other modules, such that at least one line of modules branches to form a plurality of lines of modules.

14. The system according to claim 1, wherein numbers or positions of individual turbines within at least one module differ from those within at least one other module in the array of modules, and wherein sizes, shapes, rotation directions or spacings of individual turbines vary within a module or within an array of modules, and wherein modules are stacked one above another, thus providing multiple rows of individual turbines and generators at different heights.

15. The system according to claim 1, wherein the electrical linkages are jumper cables or structural connector rails.

16. The system according to claim 1, further comprising a plurality of mechanical linkages between neighboring modules of the plurality of modules.

17. The system according to claim 1, wherein the electrically conductive structural rails comprise metal rails, tubes, beams, bars, or girders.

18. The system according to claim 1, wherein the first electrical terminal of the electrical generator of each module is mechanically attached to the first rail of the module, and wherein the second electrical terminal of the electrical generator of each module is electrically connected to the second rail of the module by the wind turbine which drives the electrical generator.

19. A system for capturing energy from wind, comprising a plurality of modules, wherein each of said modules comprises:
one or more electrically conductive structural rails;
at least one wind turbine, supported by at least one of said electrically conductive structural rails; and
at least one electrical generator, driven by said at least one wind turbine, said at least one electrical generator comprising at least a first electrical terminal which is electrically connected to at least a first of said electrically conductive structural rails, and at least a second electrical terminal which is electrically connected to a separate electrical conductor that is electrically isolated from said first electrically conductive structural rail, said modules being electrically linked to one another such that each of said first electrically conductive structural rails is electrically connected to the electrically equivalent electrically conductive structural rail on at least one adjacent module such that a linked array of said modules comprises at least one line of concatenated electrically conductive structural rails, said line of concatenated electrically conductive structural rails together with the said electrical conductor(s) being adapted to convey electrical energy from the wind turbine generators to a chosen location or locations for consumption, storage, or onward transmission of said electrical energy,
wherein each module comprises two rows of turbines with the turbines arranged in pairs, one above the other, such that each turbine in any pair counter-rotates with respect to the other turbine of that pair, one driving rotation of an array of magnets and the other driving rotation of an array of electrical coils in the opposite direction, such that voltage generated within said array of electrical coils is higher than would be generated by a single turbine rotating at an angular velocity of either turbine in the pair.

20. A method of erecting an array of wind turbine modules, wherein each of said modules includes one or more electrically conductive structural rails, at least one wind turbine, supported by at least one of said electrically conductive structural rails, and at least one electrical generator, driven by said at least one wind turbine, said at least one electrical generator comprising at least a first electrical terminal which is electrically connected to at least a first of said electrically conductive structural rails, and at least a second electrical terminal which is electrically connected to a separate electrical conductor that is electrically isolated from said first electrically conductive structural rail, said modules being electrically linked to one another such that each of said first electrically conductive structural rails is electrically connected to the electrically equivalent electrically conductive structural rail on at least one adjacent module such that a linked array of said modules comprises at least one line of concatenated electrically conductive structural rails, said line of concatenated electrically conductive structural rails together with the said electrical conductor(s) adapted to convey electrical energy from the wind turbine generators to a chosen location or locations for consumption, storage, or onward transmission of said electrical energy, wherein each module, in service, is raised above the level of the ground or away from any other surface on which the array of modules is located, by means of a pair of supporting poles, one end of a first supporting pole being fixedly attached to a proximal end of said module, and one end of a second supporting pole being fixedly attached to a distal end of said module, the method comprising laying a line of foundations, said foundations comprising metal poles and plates, at intervals corresponding to a horizontal length of each wind turbine module, each of said modules with attached supporting poles being initially laid out on the opposite side of the line of foundations to any adjacent modules with attached supporting poles, each supporting pole being attached by a hinging mechanism to one of the foundations, and each module being raised to an upright position by rotating the assembly comprising said module and its two attached supporting poles, about the hinged attachment points of the supporting poles to the foundations, mechanically attaching said module and supporting poles, once upright, to adjacent modules and supporting poles similarly raised to an upright position.

* * * * *